(12) United States Patent
Kharlamov et al.

(10) Patent No.: US 7,907,656 B2
(45) Date of Patent: Mar. 15, 2011

(54) HARMONIC FREQUENCY CONVERSION MODULE

(75) Inventors: Boris Kharlamov, Santa Rosa, CA (US); Vincent Issier, Windsor, CA (US); Andy Miller, Windsor, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 159 days.

(21) Appl. No.: 11/944,871

(22) Filed: Nov. 26, 2007

(65) Prior Publication Data
US 2008/0137693 A1    Jun. 12, 2008

Related U.S. Application Data

(60) Provisional application No. 60/867,212, filed on Nov. 27, 2006.

(51) Int. Cl.
*H01S 3/08* (2006.01)

(52) U.S. Cl. ............ 372/106; 372/29.02; 372/6; 372/21; 372/22

(58) Field of Classification Search ............... 372/29.02, 372/106, 6
See application file for complete search history.

(56) References Cited

U.S. PATENT DOCUMENTS

| | | | |
|---|---|---|---|
| 4,773,753 A | 9/1988 | Hirose et al. | 356/35.5 |
| 5,185,752 A | 2/1993 | Welch et al. | 372/22 |
| 5,760,948 A | 6/1998 | Bigo | 359/326 |
| 5,909,306 A | 6/1999 | Goldberg et al. | 359/337.1 |
| 5,966,391 A | 10/1999 | Zediker et al. | 372/22 |
| 6,014,249 A * | 1/2000 | Fermann et al. | 359/341.1 |
| 6,683,902 B1 | 1/2004 | Ohki et al. | 372/105 |
| 6,996,140 B2 | 2/2006 | Waarts et al. | 372/21 |
| 7,034,946 B2 | 4/2006 | Chen et al. | 356/466 |
| 2003/0185482 A1 | 10/2003 | Nakajima | 385/11 |
| 2005/0226278 A1 | 10/2005 | Gu et al. | 372/6 |
| 2005/0265407 A1* | 12/2005 | Braun et al. | 372/30 |
| 2006/0013270 A1 | 1/2006 | Yumoto et al. | 372/2 |
| 2006/0198398 A1* | 9/2006 | Fermann et al. | 372/6 |
| 2007/0098023 A1* | 5/2007 | Lu et al. | 372/6 |
| 2007/0248136 A1* | 10/2007 | Leonardo et al. | 372/55 |
| 2008/0124023 A1 | 5/2008 | Guerin | 359/326 |
| 2008/0212916 A1 | 9/2008 | Duesterberg et al. | 385/137 |

FOREIGN PATENT DOCUMENTS

| | | |
|---|---|---|
| CA | 2577189 | 3/2006 |
| EP | 0214907 | 3/1987 |
| FR | 2 874 272 A | 2/2006 |

* cited by examiner

*Primary Examiner* — Tod T Van Roy
(74) *Attorney, Agent, or Firm* — Matthew A. Pequignot; Pequignot + Myers LLC

(57) ABSTRACT

A harmonic frequency conversion module is disclosed including a polarization maintaining (PM) fiber optical link for providing an output stabilized from power fluctuation by the inclusion of one or more polarizers in the PM fiber optical link. Removing polarization distortions removes noise which has a significant negative effect on the output of harmonic frequency conversion elements. It has been found that the noise in frequency converted light has additional components, caused by mode interaction during conversion. In accordance with the present invention, we are able to remove the spikes in this noise, making it more stable and less dependent on external conditions. If the PM optical fiber route consists of multiple elements creating polarization distortions, a polarizer should be inserted between the most distorting element and the output of the fiber system. If many elements contribute to polarization distortions, several polarizers can be inserted into the system.

9 Claims, 10 Drawing Sheets

HARMONIC FREQUENCY CONVERSION MODULE

CROSS-REFERENCE TO RELATED APPLICATIONS

This application claims priority from U.S. provisional application No. 60/867,212 filed Nov. 27, 2006, herein incorporated by reference for all purposes.

MICROFICHE APPENDIX

Not Applicable.

TECHNICAL FIELD

The present invention relates to a harmonic frequency conversion module including a polarization maintaining (PM) fiber optical link for providing an output stabilized from power fluctuation by the inclusion of one or more polarizers in the PM fiber optical link following polarization distorting structures of the harmonic frequency module. Removing these distortions stabilizes the output power from fluctuation, and more significantly removes noise which has a significant negative effect on the output of harmonic frequency conversion elements.

BACKGROUND OF THE INVENTION

Non-linear crystals for second harmonic generation (SHG) or other frequency conversion devices, such as Sum Frequency Generation (SFG) or Third Harmonic Generation crystals, are highly polarization sensitive converting only one linearly polarized light (horizontal or vertical depending on the crystal cut). Modules providing linearly polarized pump light coupled by polarization maintaining (PM) optical fiber to the non-linear crystal have been constructed to satisfy the polarization sensitivity of the non-linear crystal. However, such an optical system produces power fluctuation and noise in its output.

Second harmonic generation is a commonly practiced technique for obtaining coherent light at short wavelengths from long wavelength laser sources. It is a non-linear process where an optical beam, called the pump beam, interacts with an optically non-linear medium, in the case of second harmonic generation, to generate a second harmonic beam, where the frequency of the second harmonic beam is twice the frequency of the pump beam. Equivalently, the free space wavelength of the second harmonic is half the free space wavelength of the pump. Any material which lacks inversion symmetry can be used as the optically non-linear medium for second harmonic generation. Materials which are commonly used include lithium niobate, MgO-doped lithium niobate and KTP ($KTiOPO_4$). Second-harmonic generation is one of a class of methods, known collectively as non-linear frequency mixing. A typical waveguide device incorporating a non-linear crystal uses a periodically poled ridge waveguide optical structure to generate or amplify coherent light at a desired wavelength from light at an input, or from a pump.

A SHG module 100 is illustrated at FIG. 1 including an external cavity laser 10, a PM fiber optical link 20, and a non-linear crystal waveguide structure 30. The external cavity laser 10 comprises a semiconductor gain chip 12 provided in a hermetic package 14 having a hermetic fiber coupling to a PM fiber external cavity 16 having a fiber grating 18. The PM fiber optical link 20 comprising the external cavity 16 and the fiber link 22 to the non-linear crystal waveguide structure 30, can be coupled into the grating 18 in discreet segments fusion coupled into either end of the grating 18, or a fiber Bragg grating can be imprinted directly into a single fiber link from the semiconductor gain chip 12 to the non-linear crystal waveguide structure 30. The non-linear crystal waveguide structure 30 is also provided within a hermetic package 32 having a hermetic fiber coupling to the fiber link 22 and a further hermetic fiber coupling to an output fiber 34. A collimator 36 terminates the output fiber 34 for coupling into an optical system. As stated above however, such an optical system produces power fluctuation and an additional excess noise in its output.

Close analysis of this problem has revealed the factors contributing to instability of the harmonic frequency conversion module power output and noise. PM fibers are used for transmitting polarized light. But their transmission is high for both polarizations, therefore polarization quality of the output light depends on: a) polarization quality of incoming light, b) quality of alignment of input and all intermediate elements. If the incoming polarization is easy to control, quality of alignment is often limited. If it is non-ideal, inevitably two orthogonal polarization modes with different propagation speeds are created in the PM fiber.

Since PM fiber is temperature sensitive, with changes in temperature causing the birefringence, the Δn difference in refractive index between the orthogonal axes, to vary, the two orthogonal polarization modes have phase shift at the output of the fiber which changes with fiber temperature. In addition, external stresses applied to the PM fiber, such as by solder at fiber ferrules, holders and feedthroughs cause changes to the polarization properties of the light. Therefore even ideally aligned polarization before soldering may be spoiled after soldering. The result of these effects is observable statistically, but not controllable. If an analyzing device on the output (for example, a non-linear crystal) is polarization sensitive, polarization beating caused by interference will create power fluctuations as a function of non-controlled, or restrictedly controlled parameters. These parameters include the temperature of every element within the fiber route, stress on the fiber, laser pump current and pump power and atmospheric pressure, which can all affect the polarization extinction ratio (PER) within the optical fiber link. Such power fluctuations include a fast component, which creates additional noise with a broad spectrum.

This PER degradation results in light of both linear polarization states coupling into the PM fiber link. Light coupled into the fast and slow axes will arrive with a phase difference. If there are at least two PER degradation points, a mix of polarizations on each axis can result, causing interference. The relative phase difference changes with temperature, altering the interference and changing the amount of light coupled to the harmonic frequency converter. The result is seen as amplitude fluctuation in the harmonic frequency converter output.

While it is possible to control manufacturing processes to improve alignment of the birefringent fiber axes to the linearly polarized pump light, stress on the birefringent fiber at solder locations and hermetic feedthroughs is more difficult to control. Looking at FIG. 1, major polarization distortion points, the regions with the strongest polarization distortions due to stress in the fiber fixture are labeled X1. The fiber grating is also a potential source of polarization distortions and it is labeled X2 as minor polarization distortion points. A second parasitic linear polarization orthogonal to the first linear polarization converted by the non-linear crystal waveguide is introduced into the PM fiber link at these distortion points. The birefringence of the PM fiber causes interference between light traveling in the fast and slow axes. With changing temperature, the birefringence in the fiber changes altering the transmission power of the first linear polarization. This partially explains the output power fluctuation. A further disruption to the output power is contributed by noise.

A US patent application No. 2005/0226278 by Xinhua Gu et al. has also observed the PER distortion points in PM fiber at the fiber ferrule, the fiber holder or at a fusion splice. In that case, the authors are proposing a fiber laser for outputting high power short laser pulses. Their structure includes a mode locked fiber oscillator, a variable attenuator, an amplifier and a compressor for compressing the pulse width. They propose using waveplates and polarizers in the modules. "The linear polarizers counter the superposition of the phase shift from each polarization degrading element . . . by embedding linear polarizers throughout the series of modules, the PER of the aggregate system can be substantially controlled such that the intensity fluctuation is below about 1 percent . . . ." However, the noise in that fiber laser output is solely noise of IR. By contrast, the noise in frequency converted light has additional (in some embodiments dominating) components, caused by mode interaction during conversion. Not all mechanisms of this excess noise are even clear yet.

Accordingly, an optical system including a polarization sensitive device that is not subject to output power fluctuation, and interference noise remains highly desirable.

SUMMARY OF THE INVENTION

The present invention has found that the insertion of a polarizer in a PM-fiber-based harmonic frequency conversion module removes the second, parasite polarization. In the case of single PM fiber optical link it removes completely the power fluctuations and excess noise. If the PM optical fiber route consists of multiple elements creating polarization distortions, a polarizer should be inserted between the most distorting element and the output of the fiber system. Improvement depends on the level of distortion created by other elements of the system. If many elements contribute to polarization distortions, several polarizers can be inserted into the system, following the significant distorting elements. Such a polarization controlling system reduces power fluctuations and excess noise to the minimal level, limited by the quality of polarizer and precision of its alignment. It has been found that the noise in frequency converted light has additional components, caused by mode interaction during conversion. In accordance with the present invention, we are able to remove the spikes in this noise, making it more stable and less dependent on external conditions (ambient temperature) and to some extent we even decrease the average level of noise.

Accordingly, an object of the present invention is to provide an optical harmonic frequency conversion module comprising:
a fiber laser generating a substantially linearly polarized light output of a first linear polarization mode;
a non-linear crystal device for converting the light output from the fiber laser having a first frequency at the first linear polarization mode into an output light having a second frequency; and
an polarization maintaining optical fiber link for coupling the substantially linearly polarized light output of the first linear polarization from the fiber laser into the non-linear crystal device, the PM optical fiber link including a plurality of polarization distortion points introducing a second parasitic linear polarization mode; and
at least one polarizer disposed in the polarization maintaining optical fiber link following at least one polarization distortion point in the direction of optical transmission from the fiber laser.

A further embodiment of the present invention provides an optical harmonic frequency conversion module, wherein one at least one polarizer is disposed in the polarization maintaining optical fiber link immediately prior to coupling into the non-linear crystal device.

The invention further provides an optical harmonic frequency conversion module, wherein a plurality of polarizers are disposed following a plurality of polarization distortion points in the direction of optical transmission.

The invention further provides an optical harmonic frequency conversion module, wherein the at least one polarizer comprises an in-fiber polarizer, polarizing fiber for at least a portion of the polarization maintaining optical fiber link, or polarizing fiber for substantially all of the polarization maintaining optical fiber link.

In an aspect of the invention, an optical harmonic frequency conversion module is disclosed wherein the non-linear crystal device is a second harmonic generation device, a third harmonic generation device, a sum frequency generation device, or a periodically poled lithium niobate ridge waveguide device.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
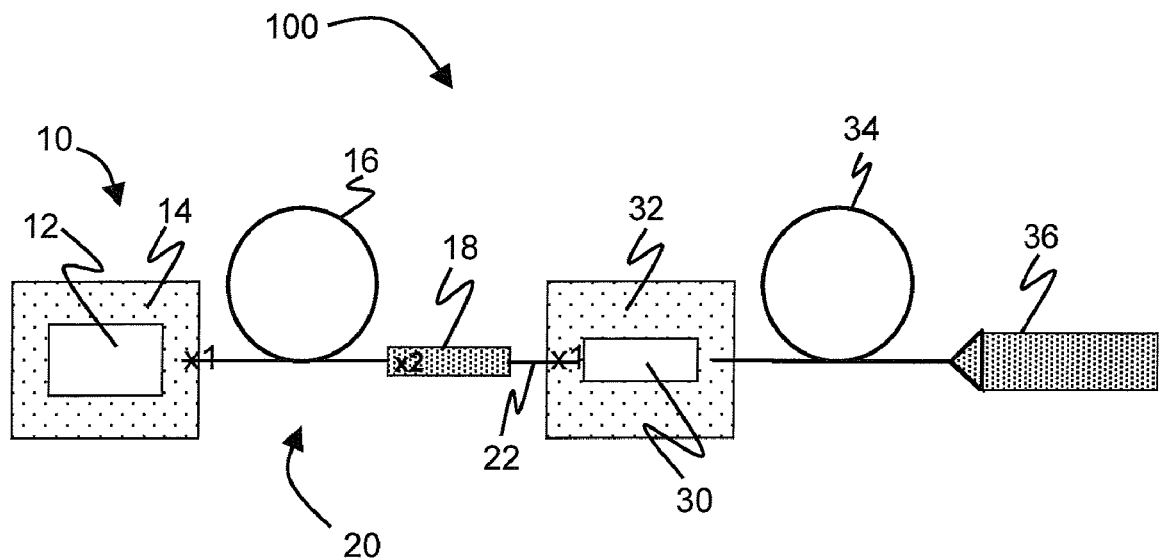
FIG. 1 is a schematic illustration of a SHG optical system.

The module 100 architecture seen in FIG. 1 includes many fiber joints and solder stress points: coupling to the laser diode 12; at the hermetic feedthrough to the hermetic package 14; at the input and output of the fiber Bragg grating 18; at the hermetic feedthrough into the hermetic package 32; into the collimating lens for coupling into the SHG non-linear crystal 30; and at the output of the non-linear crystal; again through a hermetic feedthrough out of the hermetic package 32 and into the output collimating lens 36. These joints are potential sources of polarization distortions. The main contribution to polarization distortion in this structure comes from the input and output of the fiber, where fiber is stressed heavily by soldering (at the laser diode 12 and into the SHG non-linear crystal device 30 and the hermetic packages 14, 32; and from the fiber Bragg grating 18, which often has relatively low polarization extinction ratio (PER)). As a result, rather large polarization distortions are accumulated in the module 100 which lead to high output power fluctuations. These can be seen in response to variation of ambient temperature; and as random spikes in noise and current when the module 100 is operated in constant power mode. A substantial decrease of operating power and excess noise are also observed in the frequency doubled output.

Figure 4:
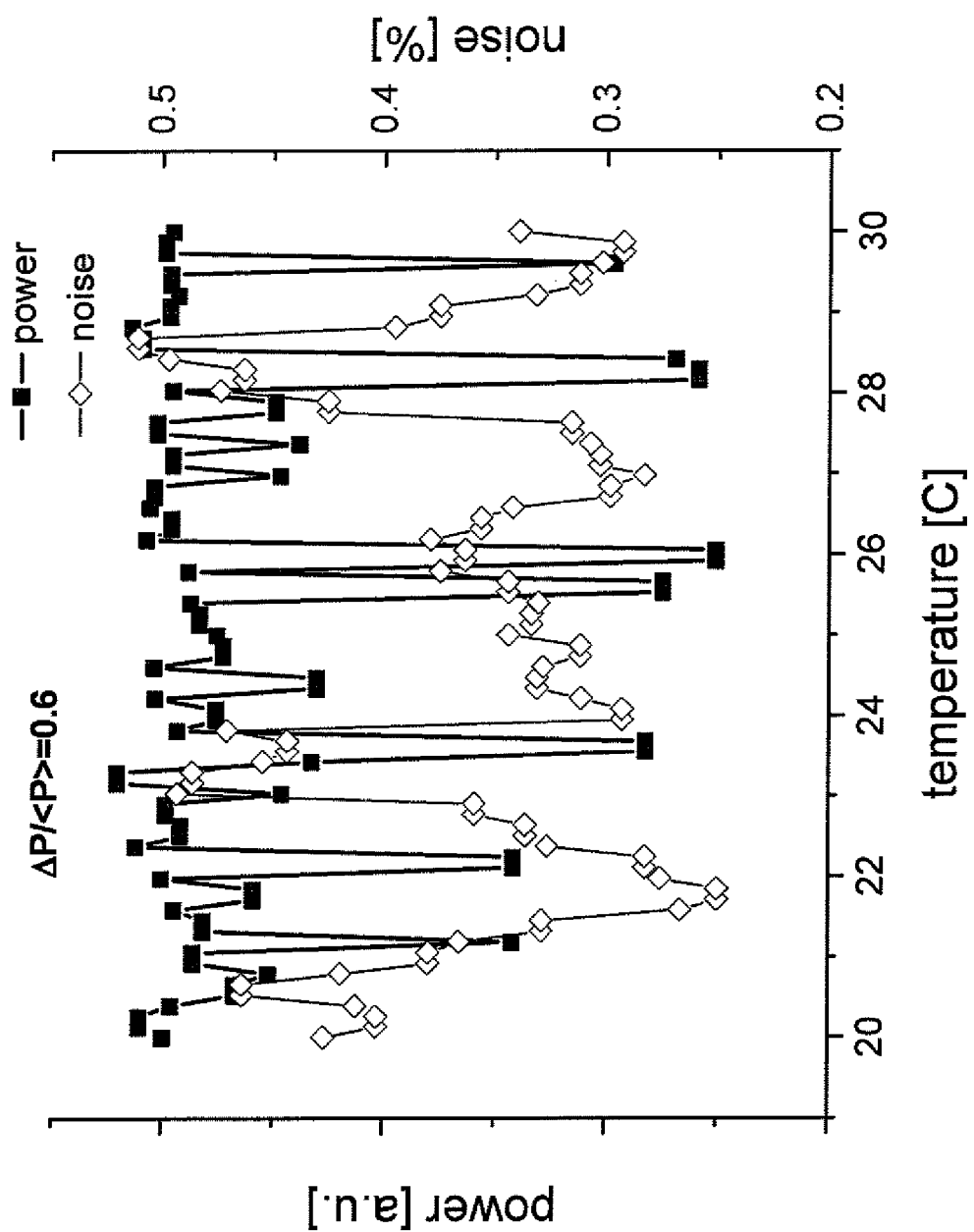
FIG. 4 is a graph of the power and noise fluctuation of an SHG device as a function of temperature without modification in accordance with the present invention.
Figure 5:
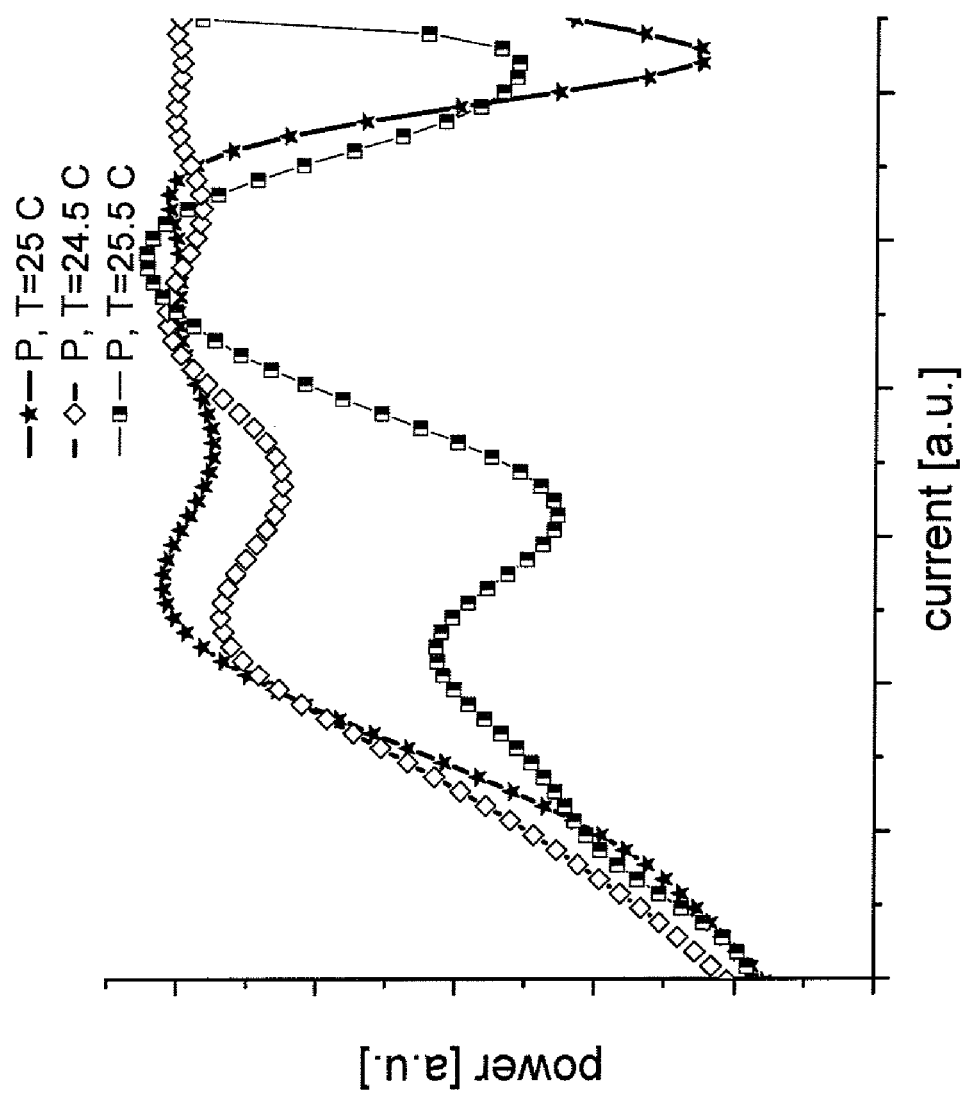
FIG. 5 is an LI curve of an SHG device without modification in accordance with the present invention at different ambient temperatures.
Figure 6:
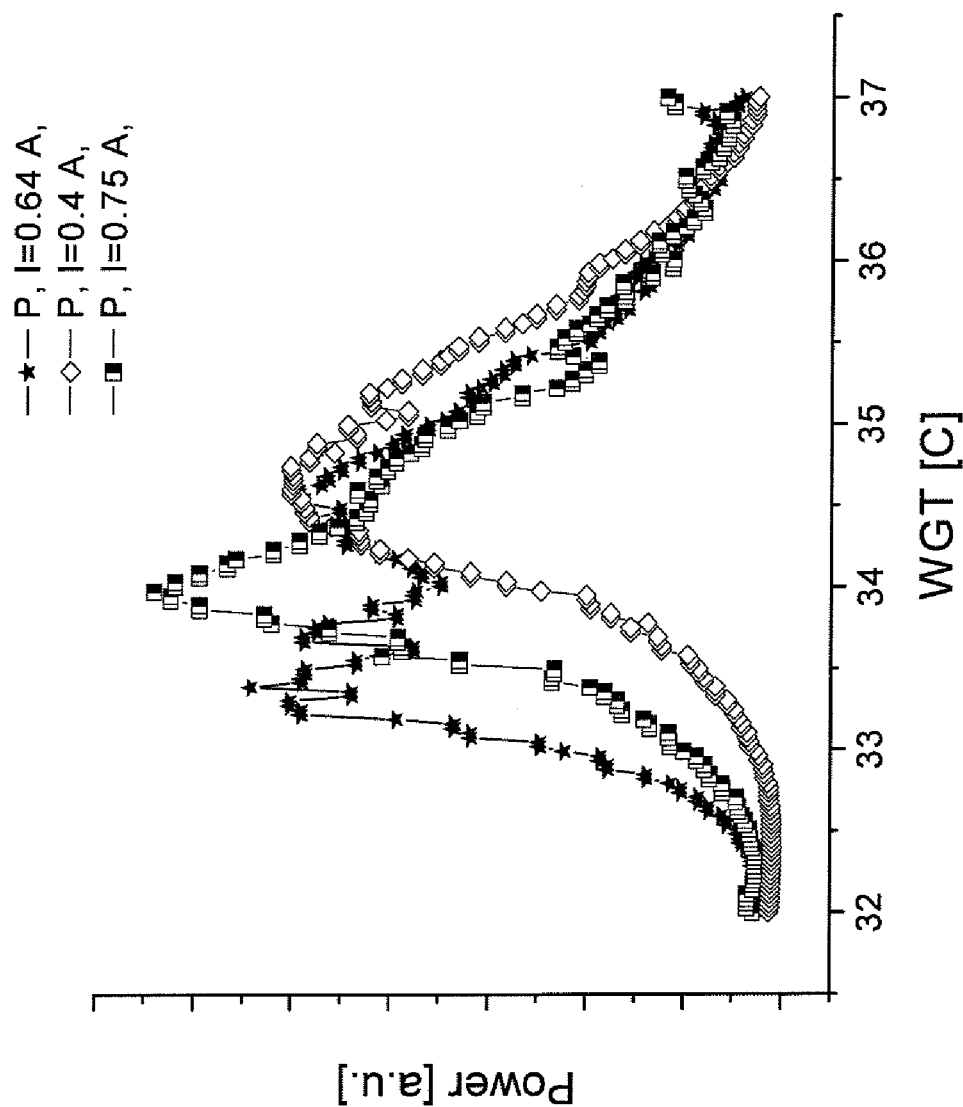
FIG. 6 is a phase matching curve of a periodically poled lithium niobate waveguide converter in the SHG device of FIGS. 4 and 5 measured at different currents.

These effects can be seen graphically in FIGS. 4, 5 and 6. The data in these graphs is based on a SHG device having a 976 nm pump and a periodically poled lithium niobate ridge waveguide generating an output at 488 nm. As can be seen in FIG. 4, the output power (shown as solid squares in FIGS. 4, 7 and 10) in second harmonic, measured at constant current of pump laser, was unstable and shows strong sensitivity to the ambient temperature. Noise (shown as open diamonds in FIGS. 4, 7 and 10) also shows a strong periodic dependence on temperature and sometimes had irreproducible sharp spikes. Sometimes the power varies up to 60 percent with temperature changes of just 0.1-0.2 degrees C. The noise recorded has peaks exceeding the 0.5 percent level.

In order to operate in constant power mode, the output power cannot be set higher than the minimum power at maximum current. If there are large power fluctuations at ambient temperature variations, the working power is limited by the largest power fluctuations. For example, if at ideal alignment the device provides P=50 mW at Imax and no power fluctuations, the working power can be set at 50 mW. If however, the power fluctuates 50%, at some temperatures Pmax will be only 25 mW, with all other parameters of the system the same, the working power cannot be set higher than this value. Insertion of a polarizer 24, 26, in the SHG module 102,103, adds some losses and decreases the peak power, but it simultaneously increases a minimum power, reducing fluctuations.

Examining the graph in FIG. 5, the LI curves of the output measured at different ambient temperatures are non-monotonic making laser operation in constant power mode unstable. Further the shape of the curve changes dramatically at temperature variation as small as 0.5 degrees C.

Finally the phase matching curve, shown in FIG. 6 of the non-linear crystal waveguide output as a function of laser current and ambient temperature, has a peak that moves more than 1 degree C. when the pump laser current changes. It even becomes a double peak at intermediate current. These distortions are caused by the polarization modes beating, and the high sensitivity of the phase shift between two polarization modes to external factors of temperature and stress. The stress on the birefringent fiber at soldering joints is very sensitive to external conditions, in particular, to the package temperature. When the non-linear crystal waveguide device is adjusted in temperature for phase matching, the stress in the soldering joint at the waveguide package is changed, causing additional change in the phase shift between the two polarization modes.

The phase matching curves of the frequency converting module are distorted, as can be seen from the FIG. 6. Compared to the curve of FIG. 9, taking into account that the phase matching curve position and shape in FIG. 9 become insensitive to external parameters: current and ambient temperature, it is apparent that it is not the property of the waveguide. The effects seen in FIG. 6 are entirely due to interference of polarization modes on the input of waveguide and sensitivity of the phase shift between them to above parameters. If one polarization mode is removed, this effect is also removed. Formally, it can be derived from the presence of polarization misalignment and from the fact, that phase shift between two polarizations depends on laser current and waveguide package temperature. Although this effect is not evident without focused analysis.

As a consequence of this effect (variation of phase matching curve with laser current), LI curves of the SHG device may become (a) non-monotonic; (b) function of ambient temperature as demonstrated in FIG. 5. It is impossible to run the conversion module in constant power mode with such LI curves at a power above the lowest saddle point on the "worst" curve: the curves transform into each other at ambient temperature variation. The working point, being initially on positive slope of the curve, may move to the negative slope topologically invariantly (e.g. without any abrupt or even without any at all change of current). Practically, that means a control loop would become unstable on the negative slope and current would increase abruptly till the module reaches positive slope at higher current (if it would be possible at all). It would create noise spikes. These unpredicted effects are not present in an IR laser, such as disclosed by Gu et al. without the non-linear conversion element.

The dependence of phase shift on laser current causes the following observed effect: in certain situations in constant power mode, when compensation of the power decrease requires an increase of current, this increase of current, accompanied by an additional phase shift between two polarizations, would lead to a decrease of the "convertible" part of the IR pump power. An effect, similar to the one described above of a laser reaching the negative slope of LI curve appears. The increase of current would cause a decrease of output SHG power. (The total IR power would increase just as it should). A rapid increase of current would continue until an additional phase shift reached π, after this point dependence of the output SHG power on current becomes positive again. This response causes spikes in noise. These spikes appear at certain temperature points, independent of how quickly the ambient temperature is changed. This effect has a threshold, it appears at certain level of polarization distortions. It is entirely related to the polarization sensitivity of the frequency converter and phase shift sensitivity to laser current. Both these issues are not at issue in the Gu et al publication.

Figure 2:
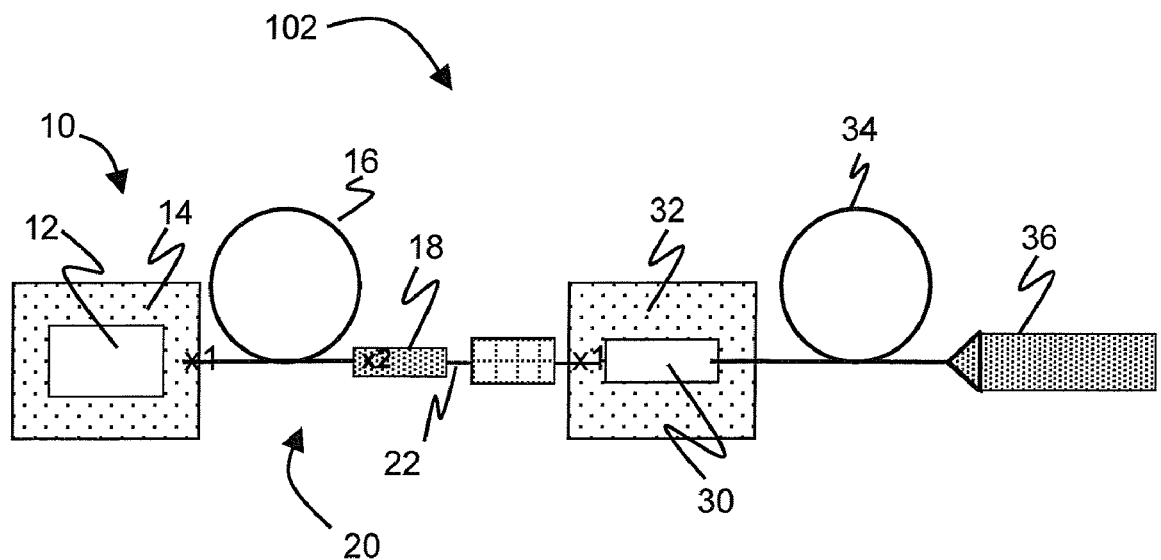
FIG. 2 is a harmonic frequency conversion module having a polarizer in the PM fiber optical link, in accordance with the present invention.

If one polarizer is inserted into the optical path, as shown in FIG. 2, substantial improvement is observed. As shown in FIG. 2, a polarizer 24 is included in the PM fiber link 20 following polarization distortion points at the laser 10 and grating 18. In-fiber polarizers, produced by Chiral Photonics Co. were tested in the design. The in-fiber polarizer is advantageous for use in a fiber based system. It can be spliced into the fiber route with low losses (typically less than 0.3 dB) without additional optical elements. Insertion losses of the device are less than 2 dB and PER is greater than 30 dB. Polarizing fiber can also be used as a polarizer in this structure. Unlike PM fiber, polarizing fiber exhibits very high losses for the second polarization, functioning practically as a fiber polarizer. Ideally all of the optical fiber link 20 would be made of polarizing fiber, though splices are likely necessary to include the fiber Bragg grating 18.

Figure 7:
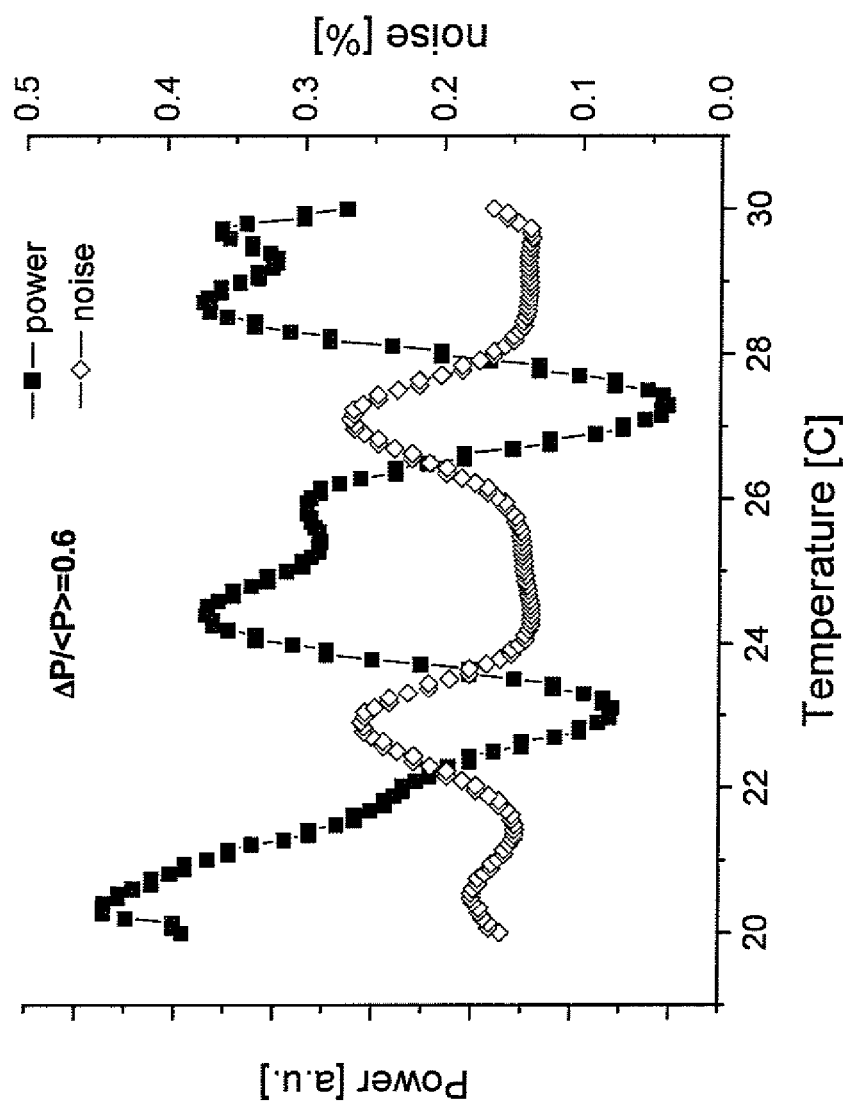
FIG. 7 is a graph illustrating the power and noise fluctuation of an SHG device including a polarizer as shown in FIG. 2.

Turning to FIG. 7 using the module of FIG. 2, the power and noise variation with ambient temperature now shows a longer period of modulation as compared to FIG. 4. Also both the average level of noise and the noise peaks are much lower.

Insertion of even one polarizer in the optical fiber link 22 connecting the fiber grating 18 and the SHG module 30 substantially improves the performance of module 102. This can be seen as reduced power fluctuations and instabilities; reduced noise; and optimization of SHG operating temperature selection (it becomes insensitive to laser current and ambient temperature). This single polarizer 24 removes the negative consequences of polarization distortions only in two elements: the fiber grating 18 and waveguide package input. Therefore the scale of improvement depends on the level of distortions, created by other listed above elements. If their contribution is minor, improvement would be close to ideal.

It should be noted that experiments were conducted using semiconductor fiber coupled lasers, but these could be replaced by rare earth doped fiber lasers. Similarly, frequency conversion is accomplished in a non-linear crystal waveguide device, but this could encompass non-linear bulk crystals, periodically poled non-linear crystals with and without waveguides as well as non-linear crystal waveguide devices.

Figure 8:
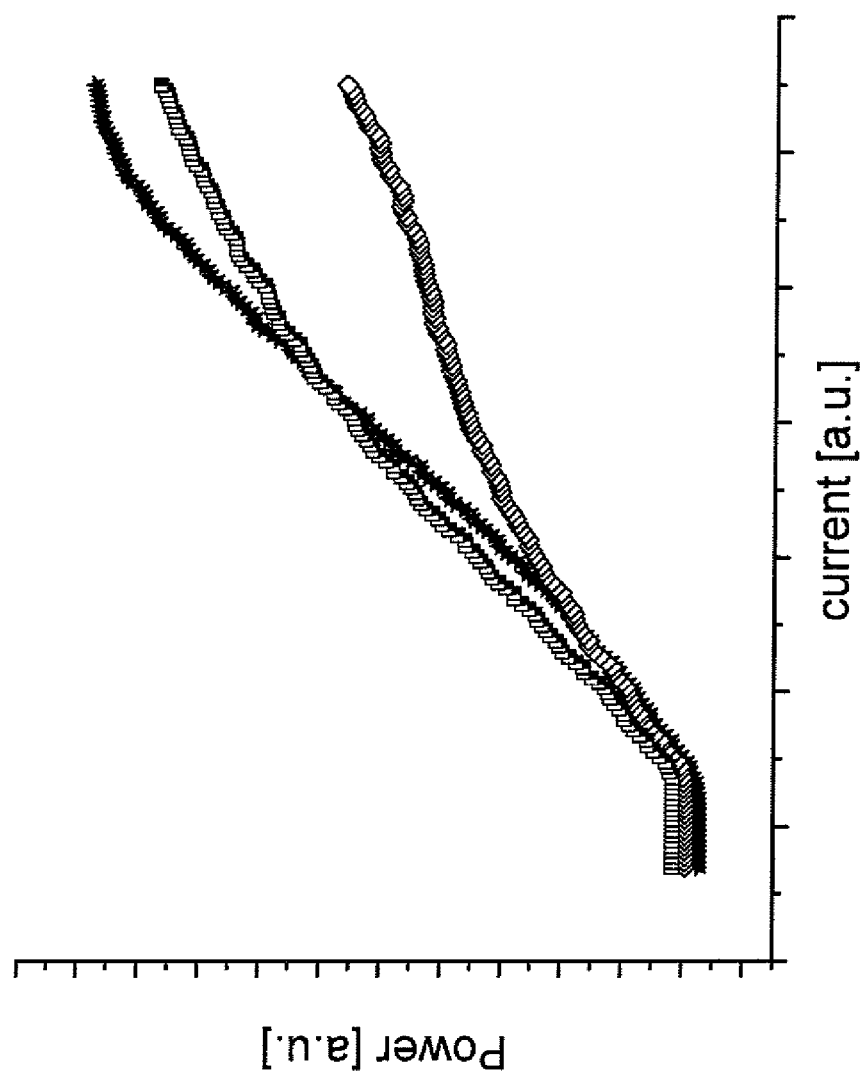
FIG. 8 is an LI curve of the SHG device of FIG. 7.

FIG. 8 shows that the LI curves for the module of FIG. 2 are still temperature dependent, but have become monotonic.

Figure 9:
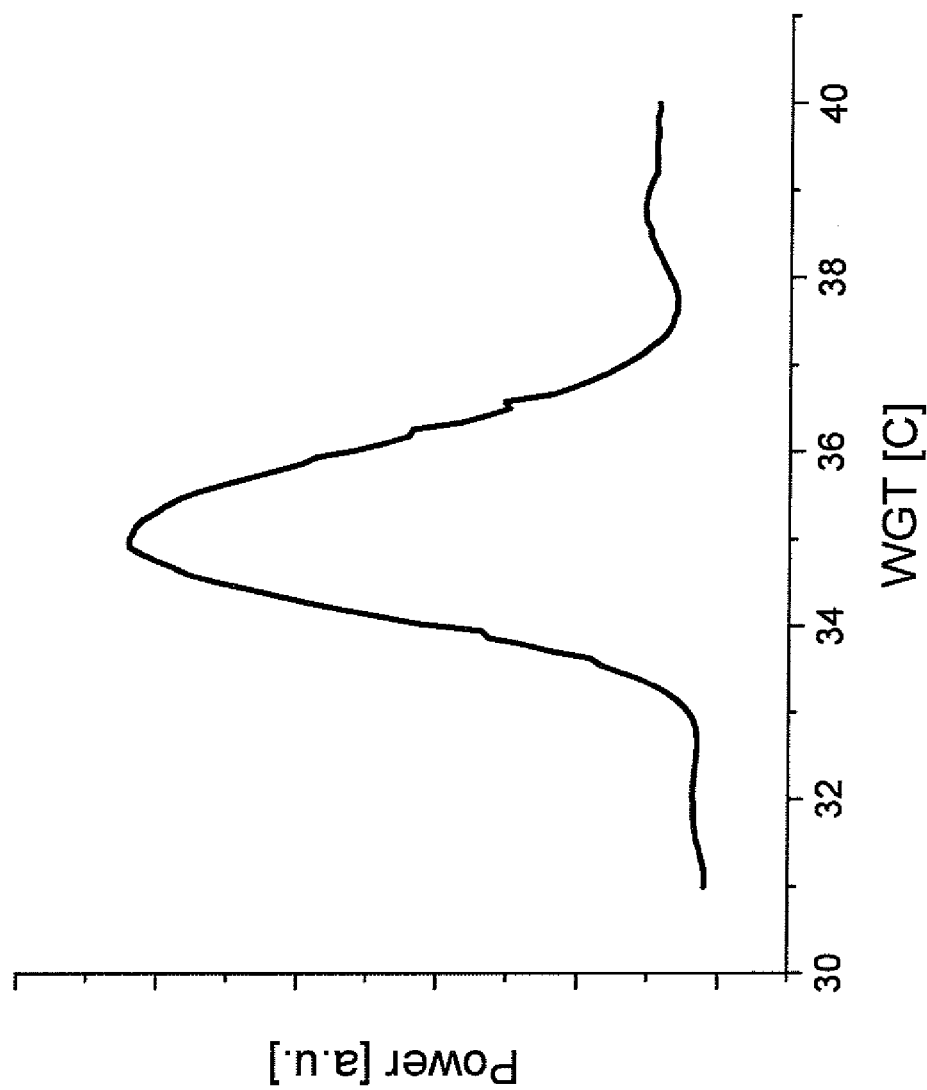
FIG. 9 is a phase matching curve of the output of the module of FIG. 7.

FIG. 9 reveals a remarkably different phase matching curve, more closely matching predicted theoretical outputs. Importantly, its shape is no longer dependent on pump laser current.

The insertion of a single polarizer does not remove power fluctuations, since the module has several polarization misalignment points. By providing a second polarizer further improvement is observed.

Figure 3:
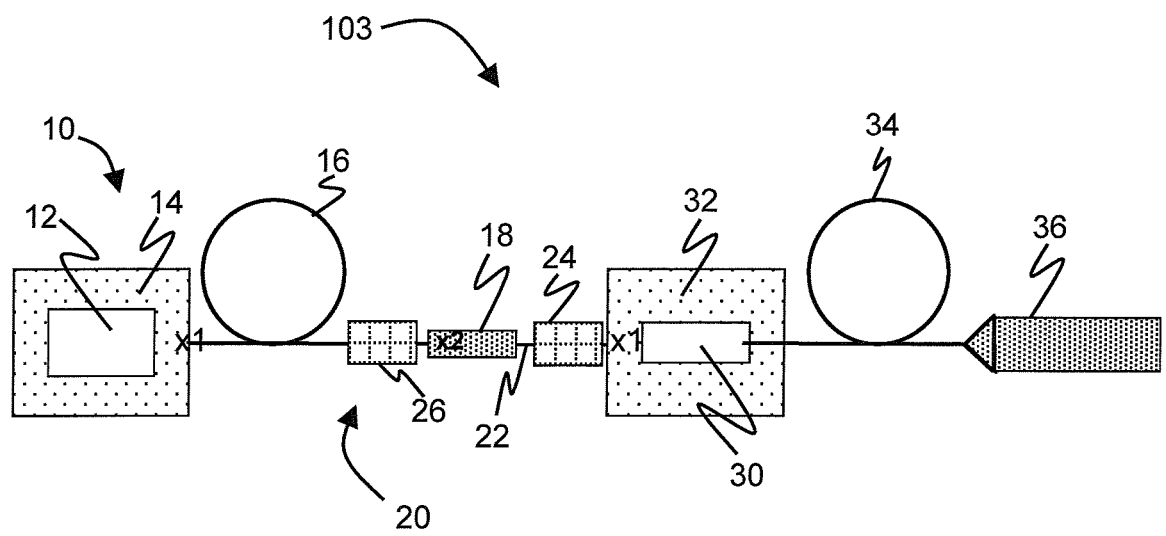
FIG. 3 is a harmonic frequency conversion module as shown in FIG. 2 further incorporating a second polarizer in the PM fiber optical link following additional polarization distorting elements.
Figure 10:
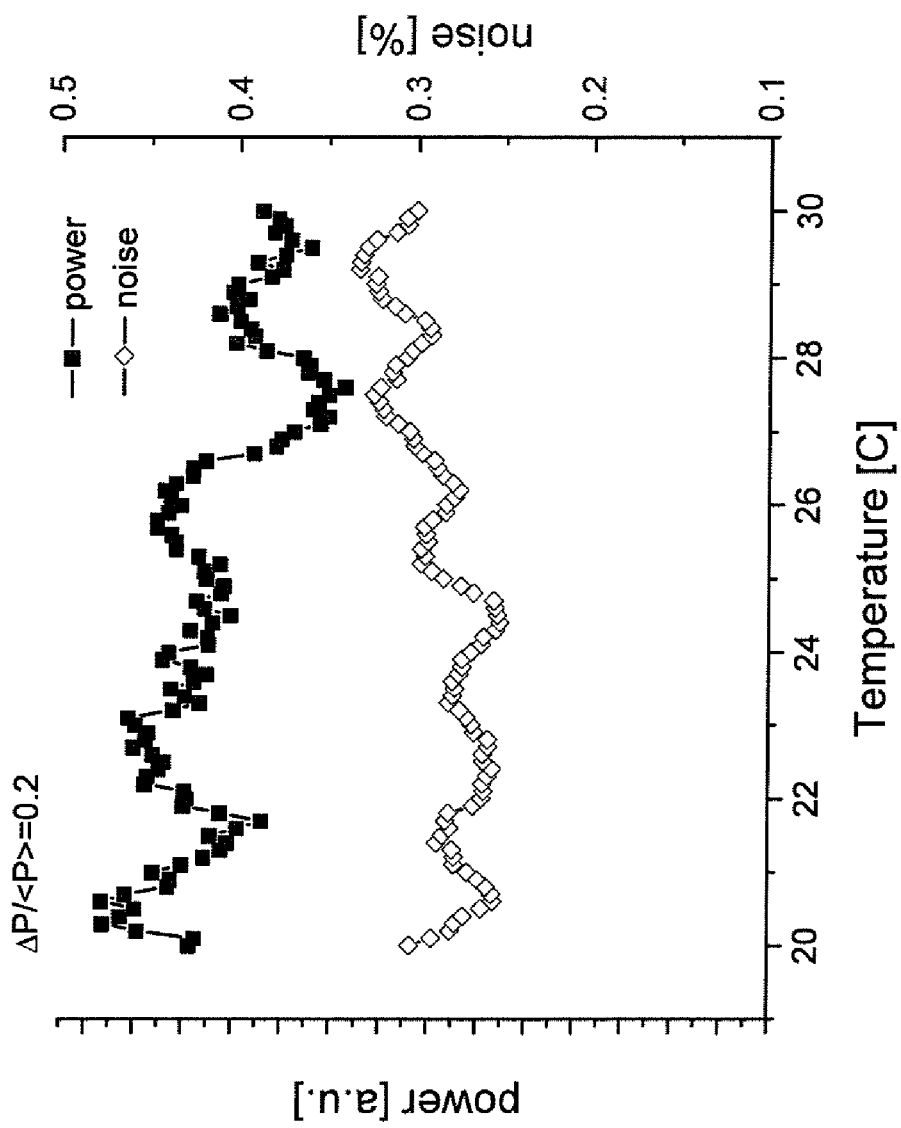
FIG. 10 is a graph of the power and noise fluctuation of an SHG device including two polarizers as shown in FIG. 3.

FIG. 3 illustrates a harmonic frequency conversion module in accordance with the invention. In this embodiment in addition to polarizer 24, as shown in FIG. 2, polarizer 26 is incorporated within the fiber laser cavity 16. The polarizers 24, 26 are located before each most significant polarization disrupting device in the direction of optical transmission, to improve the polarization distorted by the previous distortion points. If the polarization on input to a polarization sensitive device is not clean, beatings appear after it at which point they are no longer removable. This is demonstrated by the embodiment of FIG. 2 having a single polarizer 24. No correction is made for the polarization distorted by the fiber coupling from the diode package 14 etc. entering the fiber Bragg grating 18, and resultant beatings appear at the output of the module 102 as seen in FIG. 7. Only two polarizers are sufficient in this case to completely remove output fluctuations, as shown in FIG. 10. If the FBG 18 or gain chip package 10 did not create polarization distortions, one polarizer would be enough.

FIG. 10 graphically illustrates the power and noise variation with ambient temperature for the module of FIG. 3 with two polarizers. The power modulation as shown is now very low. The noise also is stable and low. In general, noise in an SHG device with polarization misalignment becomes a function of the phase shift between two polarizations, which means, primarily, of ambient temperature. It can be seen clearly in FIGS. 4 and 7. There are several mechanisms, causing this effect, some of them we do not understand yet. But empirically we found, that improvement of polarization alignment decreases noise variations, removes noise spikes and decreases average level of noise clearly shown in FIG. 10.

Figure 11:
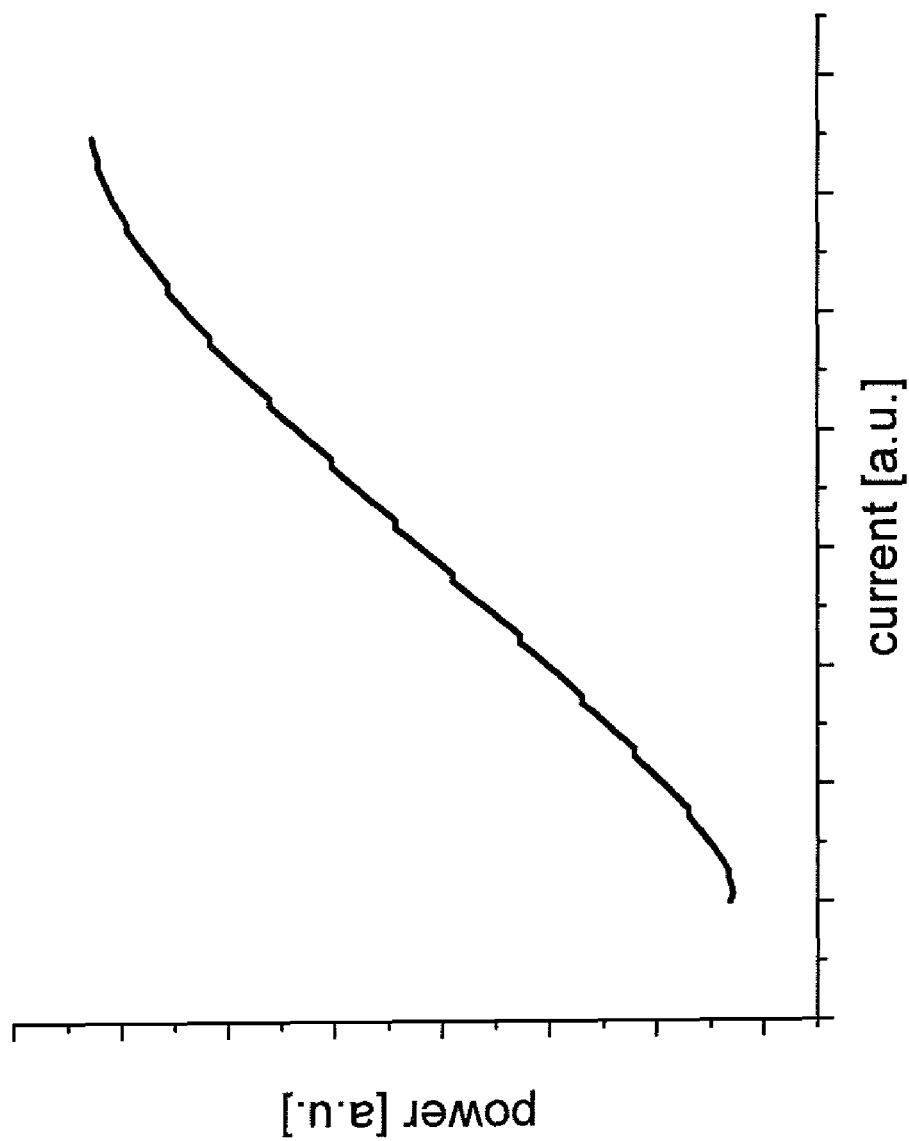
FIG. 11 is an LI curve of the SHG device of FIG. 10.

FIG. 11 is the LI curve for the module of FIG. 3. It is monotonic and nearly independent of temperature. The sample measured at T=25 C is shown on the graph.

The embodiment(s) of the invention described above is (are) intended to be exemplary only. The scope of the invention is therefore intended to be limited solely by the scope of the appended claims.

What is claimed is:

1. An optical harmonic frequency conversion module comprising:
    a semiconductor fiber coupled laser generating a substantially linearly polarized light output of a first linear polarization mode;
    a non-linear crystal device for converting the light output from the fiber laser having a first frequency at the first linear polarization mode into an output light having a second frequency; and
    a polarization maintaining optical fiber link for coupling the substantially linearly polarized light output of the first linear polarization from the fiber laser into the non-linear crystal device, the PM optical fiber link including a plurality of polarization distortion points introducing a second parasitic linear polarization mode; and
    at least one polarizer disposed in the polarization maintaining optical fiber link following at least one polarization distortion point in the direction of optical transmission from the fiber laser, wherein one at least one polarizer is disposed in the polarization maintaining optical fiber link immediately prior to coupling into the non-linear crystal device.

2. An optical harmonic frequency conversion module as defined in claim 1, wherein a plurality of polarizers are disposed following a plurality of polarization distortion points in the direction of optical transmission.

3. An optical harmonic frequency conversion module as defined in claim 1, wherein the at least one polarizer comprises an in-fiber polarizer.

4. An optical harmonic frequency conversion module as defined in claim 1, wherein the at least one polarizer comprises polarizing fiber for at least a portion of the polarization maintaining optical fiber link.

5. An optical harmonic frequency conversion module as defined in claim 4, wherein the at least one polarizer comprises polarizing fiber for substantially all of the polarization maintaining optical fiber link.

6. An optical harmonic frequency conversion module as defined in claim 1, wherein the non-linear crystal device is a second harmonic generation device.

7. An optical harmonic frequency conversion module as defined in claim 1, wherein the non-linear crystal device is a third harmonic generation device.

8. An optical harmonic frequency conversion module as defined in claim 1, wherein the non-linear crystal device is a sum frequency generation device.

9. An optical harmonic frequency conversion module as defined in claim 1, wherein the non-linear crystal device is a periodically poled lithium niobate ridge waveguide device.

* * * * *